Oct. 14, 1924.
P. A. CAMPBELL
1,511,501
LAWN MOWER
Original Filed July 15, 1921
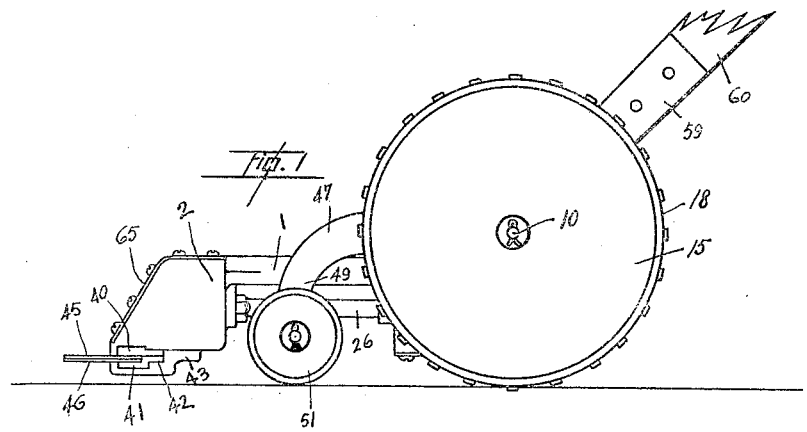
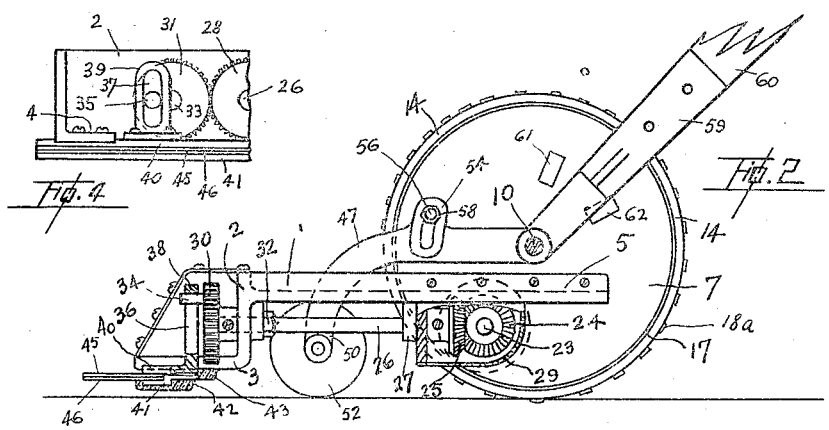
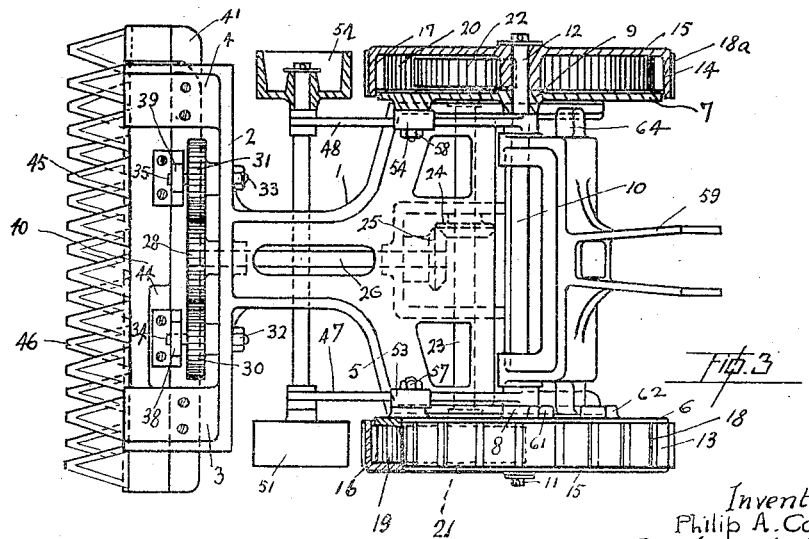
Inventor.
Philip A. Campbell Patented Oct. 14, 1924.

1,511,501

UNITED STATES PATENT OFFICE.

PHILIP ALEXANDER CAMPBELL, OF VANCOUVER, BRITISH COLUMBIA, CANADA.

LAWN MOWER.

Application filed July 15, 1921, Serial No. 485,015. Renewed March 17, 1924.

*To all whom it may concern:*

Be it known that I, PHILIP ALEXANDER CAMPBELL, a subject of the King of Great Britain, and a resident of the city of Vancouver, in the Province of British Columbia, Canada, have invented certain new and useful Improvements in Lawn Mowers, of which the following is a specification.

My invention relates to improvements in lawn mowers, and the object of my invention is to devise a mower in which the cutting blades operate laterally in shear like fashion so that the grass is shear cut as opposed to the rotary method of cutting and is therefore cut more closely, evenly, and cleanly, thus maintaining its greenness and vigour, and the mechanism of which mower is simple, strong, and efficient.

I attain this object by the construction illustrated in the accompanying drawings in which—

Fig. 1 is a side view of the mower.

Fig. 2 is a side view, the near side main wheel being removed.

Fig. 3 is a plan view, in part section.

Fig. 4 is a half front elevation.

Similar figures of reference indicate similar parts throughout the several views.

1 indicates a horizontal frame which forms the main frame of the mower the front end of which is formed substantially T-shaped as at 2 and is provided at each end of the T-portion with horizontal flanges 3 and 4 depressed out of the plane of the body portion of the frame, while the rear end of the frame is of greater width than the intermediate portion, as indicated at 5 in Fig. 3, and secured to each side face of the wide portion 5 are inner circular side plates 6 and 7 respectively. Each side plate 6 and 7 is provided with a central bearing 8 and 9 through which extends the main shaft 10 and on the projecting ends 11 and 12 of the shaft 10 the main traction wheels 13 and 14 are rotatably mounted, each of which wheels consists of an outer circular side plate 15 dished as at 16 and 17 to form peripheral traction surfaces 18 and 18ª.

These wheels 13 and 14 are formed as internal gears on their inner peripheries, as at 19 and 20, and meshing with these gears are smaller gears 21 and 22 secured to each end of a rotatably mounted transverse shaft 23 provided intermediate its length with a bevel gear 24 meshing with a bevel gear 25 secured to the end of a longitudinal shaft 26 rotatably carried at the end adjacent the gear by a suitable bearing 27 while its opposite end extends rotatably through the T-shaped portion 2 of the frame and is provided with a spur pinion 28. The gears 24 and 25 are enclosed in a suitable casing 29, while the internal gears 19 and 20 and small gears 21 and 22 are protected by the inner side plates 6 and 7 which are of slightly less diameter than the inside of the dished portions 16 and 17 and fit partially thereinto, as shown in Fig. 3.

The shaft 26 is disposed on the longitudinal axis of the frame 1 and the pinion 28 with which it is provided meshes with similar pinions 30 and 31 rotatably mounted on each side of it on studs 32 and 33 secured into the T-shaped portion 2, each of these pinions being provided with an outstanding pin, 34 and 35 respectively, placed out of centre to provide a crank pin, and these pins engage respectively in slots 36 and 37 formed in vertical brackets 38 and 39 the lower ends of which are secured respectively to the upper and lower knife-carrying bars 40 and 41 of the mower, these bars being slidably mounted for lateral movement one on the other in a slot 42 formed in the front edge of a plate 43 secured to the depressed flanges 3 and 4 transversely of the machine, and the upper knife-carrying bar is cut away as at 44 to permit of the full travel laterally of the bracket 39 of the lower knife-carrying bar. Each knife-carrying bar is provided with a plurality of spaced knives 45 and 46 having substantially flat triangular shaped blades the opposite converging edges of which are sharpened.

47 and 48 indicate arms having one end freely mounted on the shaft 10 while their opposite ends are curved downwardly, as at 49 and 50, and provided with rollers 51 and 52 which run on the ground and these arms are provided about midlength with a slotted quadrant, 53 and 54 respectively, through which extend respectively studs 55 and 56 secured into the inner side plates 6 and 7, so that the arms may be secured against movement by nuts 57 and 58 threaded on the studs on the outer side of the quadrant. By loosening the nuts the arms may be raised or lowered to alter the height of the knives from the ground.

59 indicates a handle socket freely mounted on the shaft 10 into which the handle 60 is fitted, this handle being of the well known wooden construction, the amount of inclination being controlled by stops 61 and 62 formed integrally on the side plates 6 and 7 and between which co-operating stops 63 and 64 on the socket are movable.

The pinions 28, 30 and 31 are covered with a suitable covering plate 65 secured to the frame, as shown in Figs. 1 and 2.

The manner in which the device operates will be apparent as it will be seen that on moving it forwardly the traction wheel internal gears 19 and 20 will rotate the gears 21 and 22 and the shaft 23, thus rotating bevel gears 24 and 25, shaft 26, pinion 28 and pinions 30 and 31, so that the crank pins 34 and 35 operate in the slots 36 and 37 of the brackets 38 and 39 and thus the knife-carrying bars 40 and 41 are moved laterally to and fro in opposite directions, the knives cutting the grass between them in a shear like manner.

What I claim as my invention is:—

1. A lawn mower comprising a horizontal frame T-shaped at its front end and provided with horizontal flanges at each end of the T portion depressed out of the plane of the body, a transverse bar slotted in its front edge secured to said flanges, upper and lower knifed bars laterally slidable in said slot and on each other, inner circular side plates secured to opposite sides of the frame at its rear end, a shaft extending through said side plates having rotatably mounted on its opposite ends outer circular side plates dished to form traction surfaces the inner peripheries of which are formed as internal gears, a shaft rotatably mounted transversely of the frame and provided at each end with gears meshing with said internal gears and intermediate its length with a bevel gear, a longitudinal shaft provided at one end with a bevel gear meshing with the bevel gear aforesaid and at its opposite end extending through the T portion of the frame and provided with a spur pinion, spur pinions rotatably mounted on each side of the longitudinal shaft pinion each provided with a crank pin, and vertically slotted brackets in which said crank pins are operative the lower ends of which are secured respectively to the said upper and lower knifed bars.

2. A lawn mower comprising a horizontal frame T-shaped at its front end provided with horizontal flanges at each end of the T portion depressed out of the plane of the body, a transverse bar slotted in its front edge secured to said flanges, upper and lower knifed bars laterally slidable in said slot and on each other, inner circular side plates secured to opposite sides of the frame at its rear end, a main shaft extending through said side plates having rotatably mounted on its opposite ends outer circular side plates dished to form traction surfaces the inner peripheries of which are formed as internal gears, a shaft rotatably mounted transversely of the frame provided at each end with gears meshing with said internal gears and intermediate its length with a bevel gear, a longitudinal shaft provided at one end with a bevel gear meshing with the bevel gear aforesaid and at its opposite end extending through the T portion of the frame and provided with a spur pinion, spur pinions rotatably mounted on each side of the longitudinal shaft pinion each provided with a crank pin, vertically slotted brackets in which said crank pins are operative the lower ends of which are secured respectively to the said upper and lower knifed bars, arms one end of each of which is freely mounted on said main shaft provided at their opposite ends with rollers adapted to travel on the ground, said arms being provided intermediate their length with a quadrant slot, and a stud in each inner side plate projecting through the respective quadrant slot provided with a nut whereby said arms may be secured to said inner side plates.

Dated at Vancouver, B. C., this 24th day of June, 1921.

PHILIP ALEXANDER CAMPBELL.